United States Patent
Fielding

(10) Patent No.: US 7,655,077 B2
(45) Date of Patent: Feb. 2, 2010

(54) AIR TREATMENT SYSTEM

(75) Inventor: Robert Michael Fielding, Blyth (GB)

(73) Assignee: Domnick Hunter Ltd., Birtley Co., Durham (GB)

( * ) Notice: Subject to any disclaimer, the term of this patent is extended or adjusted under 35 U.S.C. 154(b) by 684 days.

(21) Appl. No.: 10/514,278

(22) PCT Filed: May 13, 2003

(86) PCT No.: PCT/GB03/02023

§ 371 (c)(1),
(2), (4) Date: May 16, 2005

(87) PCT Pub. No.: WO03/095070

PCT Pub. Date: Nov. 20, 2003

(65) Prior Publication Data

US 2005/0217487 A1  Oct. 6, 2005

(30) Foreign Application Priority Data

May 14, 2002  (GB) ................................. 0210975.9

(51) Int. Cl.
*B01D 53/02* (2006.01)
(52) U.S. Cl. ............................ 96/109; 96/121; 96/111; 96/112; 96/116; 96/399; 96/407; 96/417; 96/420
(58) Field of Classification Search .................. 96/426, 96/109, 111, 112, 116, 399, 407, 397, 417, 96/420; 55/338, 340; 95/8, 10–14, 90; 454/74; 62/90

See application file for complete search history.

(56) References Cited

U.S. PATENT DOCUMENTS

| 4,262,495 A * | 4/1981 | Gupta et al. .................. 62/402 |
| 4,567,939 A * | 2/1986 | Dumbeck .................... 165/224 |
| 4,581,988 A | 4/1986 | Mattei |
| 4,742,760 A * | 5/1988 | Horstman et al. ............. 454/76 |
| 5,457,963 A * | 10/1995 | Cahill-O'Brien et al. ....... 62/78 |
| 5,516,330 A * | 5/1996 | Dechow et al. ............... 454/74 |
| 5,642,729 A * | 7/1997 | Cassidy ................. 128/204.29 |
| 5,791,982 A * | 8/1998 | Curry et al. ................... 454/74 |
| 5,890,367 A | 4/1999 | You et al. |
| 5,927,084 A * | 7/1999 | Fielding ........................ 62/90 |
| 5,954,577 A | 9/1999 | Meckler |

FOREIGN PATENT DOCUMENTS

DE   196 53 964 A1   6/1998
EP   1 101 641 A2   5/2001

* cited by examiner

*Primary Examiner*—Duane Smith
*Assistant Examiner*—Ives Wu
(74) *Attorney, Agent, or Firm*—Maginot, Moore & Beck

(57) ABSTRACT

An air treatment system includes a recirculation line (24) through which air from the enclosed space can be recirculated, and a contaminant adsorption assembly (36) is provided in an auxiliary supply conduit (31). In the event that contaminants are detected in atmospheric air, air from the enclosed space can be recirculated for conditioning and then readmitted to the enclosed space. Oxygen that is breathed by occupants of the enclosed space can be replenished by admitting air from atmosphere, which is treated using the adsorption assembly and then mixed with air that is in the enclosed space or being recirculated for admission to the enclosed space.

17 Claims, 2 Drawing Sheets

AIR TREATMENT SYSTEM

This invention relates to a system for treating air which is to be breathed within an enclosed space.

It can be desirable to treat air that is to be breathed to remove contaminants and also to provide a suitable proportion of the individual components of an air mixture (oxygen, carbon dioxide, nitrogen etc). Contaminants that are to be removed might be solid (in particulate form), liquid (in aerosol form) or gaseous. The enclosed space in which the treated air is to be breathed might be a building or a vehicle. An example of an application for the system of the invention might be for example in an agricultural vehicle which can be exposed to an environment containing particulate and liquid or gaseous materials which preferably the driver of the vehicle should not be exposed to. However, the invention is also concerned with treatment of air for other applications, for example for supply to a building.

It is known to remove contaminants from a gas using regenerative adsorption apparatus. Such apparatus comprises at least two chambers, each containing a quantity of an adsorbent material. The gas is directed to flow through one of the chambers so that it can be treated while the adsorbent material in the other chamber is regenerated by displacement from it of the contaminant material which has previously been adsorbed while pressure in that chamber is reduced. The adsorbed component can be displaced by means of a purge stream of gas which might be taken from the outlet stream from the chamber in which adsorption is taking place. The regeneration of the adsorbent material can involve changes in one or both of the pressure and temperature in the chamber, especially a reduction in the pressure in the chamber and an increase in the temperature.

It is a disadvantage of known regenerative adsorption assemblies that large chambers can be required in order to provide sufficient adsorbent material to treat enough air adequately for it to be breathed, especially when the contaminants in the air only bond loosely to the adsorbent material, and especially when the enclosed space is large (for example as in the case of a building).

The present invention provides an air treatment system which includes a recirculation line through which air from the enclosed space can be recirculated and in which a contaminant adsorption assembly is provided in an auxiliary supply conduit, for supply of air from atmosphere that has been treated to remove contaminants for mixture with air in the enclosed space or that is to be supplied to the enclosed space.

Accordingly, in one aspect, the invention provides a system for treating air which is to be breathed within an enclosed space, which comprises:

a. a primary inlet through which air can be admitted to the system from atmosphere,
b. a primary inlet valve by which the flow of air into the system through the primary inlet can be regulated,
c. an outlet through which air within the enclosed space can be vented to atmosphere,
d. a recirculation line through which air from the enclosed space can be recirculated, to be readmitted to the enclosed space,
e. a contaminant adsorption assembly by which contaminants in atmospheric air can be adsorbed, the assembly being provided in an auxiliary supply conduit through which air from atmosphere can flow for (i) treatment by the adsorption assembly to adsorb contaminants, and (ii) mixture with air that is in or is for supply to the enclosed space,
f. an auxiliary inlet valve by which the flow of air through the contaminant adsorption assembly and the auxiliary supply conduit can be regulated,
g. an actuator which can generate signals to control the primary inlet and auxiliary inlet valves, in which the actuator can generate signals which cause (a) the primary inlet valve to move towards its fully closed position, and (b) the auxiliary inlet valve to move towards its fully open position.

The system of the present invention has the advantage that, by providing for recirculation of air from the enclosed space, the load that is placed on a contaminant adsorption assembly can be reduced. Accordingly, air from the enclosed space that is recirculated through the recirculation line is readmitted to the enclosed space without having to pass through the contaminant adsorption assembly. This allows a smaller contaminant adsorption assembly to be used than would be the case if all of the air that is to be breathed within the enclosed space is to pass through the assembly. When atmospheric air is not contaminated, air can be admitted to the system freely as required and supplied to the enclosed space to be breathed. It will be preferred in many applications for the air to be conditioned before it is supplied to the enclosed space. For example, the system can include components for changing the temperature of the air that is admitted to the enclosed space, such as a heating device or a cooling device. Air can be discharged from the enclosed space to atmosphere, directly indirectly, for example through an outlet that is provided downstream of the enclosed space, for example in the recirculation line.

When atmospheric air is contaminated, oxygen that is depleted from air within the enclosed space can be replenished using air that is admitted to the enclosed space through the auxiliary supply conduit (whether directly or indirectly, for example through the auxiliary supply conduit).

Air in the recirculation line is reintroduced into the enclosed space without passing through the contaminant adsorption assembly. Preferably, the recirculation line introduces air from the enclosed space into a main supply conduit for reintroduction to the enclosed space. This main supply conduit can direct atmospheric air that is admitted through the main inlet into the enclosed space.

Preferably, the system includes a recirculation valve by which the flow of air through the recirculation line can be controlled. Preferably, the actuator can generate signals to control the recirculation valve, the recirculation valve being caused to move towards its fully open position together with the movement of the auxiliary inlet valve towards its fully open position and movement of the primary inlet valve towards its fully closed position.

The system can be operated with the air from the enclosed space being recirculated in order to reduce the load on apparatus by which air is heated or cooled. In these circumstances, the auxiliary inlet valve can be closed so that air from atmosphere does not flow through the contaminant adsorption assembly. Air from atmosphere can enter the system through the primary inlet with the primary inlet valve open. When atmospheric air is contaminated, the primary inlet valve can be closed and the auxiliary inlet valve can be opened (which can be accomplished using a single valve by switching it so as to close the primary inlet and to open the auxiliary inlet).

Preferably, the main supply conduit includes components for conditioning the air that is to be supplied to the enclosed space. For example, the air conditioning components can serve to change the temperature or the humidity or both of the air that is to be supplied to the enclosed space, for example of air that is admitted from atmosphere or air from the enclosed space that is recirculated. In particular, it can be preferred to include a cooling device in the main supply conduit by which air supplied to the enclosed space can be cooled. It can also be preferred to include a device which reduces the humidity of air which is supplied to the enclosed space. This can be important in some applications in order to control rises in temperature of the air that is breathed within the enclosed space.

Preferably, air from the recirculation line and from the auxiliary supply line that is admitted to the enclosed space when atmospheric air is contaminated, is admitted to the enclosed space through a supply conduit (which can be an auxiliary supply conduit or, especially, the main supply conduit mentioned above) which includes air conditioning components through which this air passes before being admitted to the enclosed space.

Preferably, the system includes a fan for circulating air through the enclosed space. The fan can be located so that it acts on air flowing in the supply conduit. The fan can function to drive air that is not contaminated from the inlet into and through the enclosed space. The fan can function to drive air from the enclosed space through the recirculation line, and through air conditioning components when present. The fan can be provided in the main supply conduit so that it can act on air from the enclosed space that is being recirculated, or on air from atmosphere that is admitted through the main inlet.

Preferably, air that is admitted to the system through the auxiliary supply conduit, generally after being treated in the adsorption assembly, is mixed with air that is in the system (for example in the enclosed space or for supply to it) downstream of the fan.

The flow of air through the contaminant adsorption assembly is controlled by the auxiliary inlet valve which can vary the rate of flow of air through the auxiliary supply conduit. The system can have just one inlet through which air is admitted from atmosphere, and the primary inlet valve and the auxiliary inlet valve can control the flow of flow of air between the said inlet and the enclosed space. For example, when air is not contaminated, it can flow directly from the primary inlet through the primary inlet valve to the enclosed space, and the auxiliary inlet valve can be closed. When air is contaminated, the inlet valve will be closed to prevent direct flow of air to the enclosed space, and the auxiliary inlet valve will be opened to allow flow of air from the inlet to the enclosed space through the auxiliary supply conduit and the contaminant adsorption assembly. The primary and auxiliary inlet valves can be provided by a single valve, for example with one inlet and two outlets, the inlet being for atmospheric air, and the two outlets providing the primary inlet and the auxiliary inlet respectively for air to flow into downstream components of the system.

It is also envisaged that the system can have separate inlets, one for air that is not contaminated and which is admitted from atmosphere through the inlet, and the other for air that is contaminated which is admitted from atmosphere independent of the inlet for non-contaminated air. This can be a preferable arrangement which allows air that is admitted directly from atmosphere to be supplied to the system upstream of a fan, and which allows air that is admitted to the system after treatment in the adsorption assembly to be supplied to the system downstream of the fan.

Preferably, the auxiliary inlet valve is adjustable to allow the volume of air that is supplied to the adsorption apparatus to be set at a suitable level. It will often be preferable for the volume of air to be kept to a minimum to minimise the loading on the adsorption apparatus. However, sufficient air should be admitted to the system through the inlet valve to allow replenishment of oxygen that has been consumed by breathing by occupants of the enclosed space. Techniques for determining an adequate replenishment of oxygen to meet demand are known.

The system has an outlet through which air from the enclosed space can be vented to atmosphere. When atmospheric air is not contaminated, and air is admitted to the system through the inlet, it will be preferred for many applications for the pressure within the space to be at or close to atmospheric pressure; in these circumstances, the outlet need not maintain a pressure differential between the enclosed space and atmosphere. When atmospheric air is contaminated, it will generally preferred for the air pressure within the enclosed space to be maintained slightly above atmospheric pressure. In these circumstances, the outlet should maintain that pressure differential. This can be achieved by modifying the outlet (for example by closing it partially from its condition when the atmospheric air is not contaminated). Alternatively, the system can have two (or more) outlets in which one outlet is used when atmospheric air is not contaminated, and another outlet maintains a pressure differential between the enclosed space and atmosphere.

Preferably, the contaminant adsorption assembly comprises at least two chambers which contain an adsorbent material, arranged so that air flowing into the assembly for supply to the enclosed space can pass through one of the chambers for adsorption of contaminants before supply to the enclosed space while adsorbent material in another of the chambers is regenerated by purging adsorbed contaminants. Preferably, the contaminant adsorption assembly is arranged to provide a change in the pressure or the temperature or both in each chamber between the phase when the chamber is exposed to air that is to be treated and the phase when the adsorbent material in the chamber is regenerating. Preferably, the assembly is arranged so that the difference in pressure in each chamber between the adsorption and regeneration phases is at least about 150 mbarg, more preferably at least about 400 mbarg, especially when the adsorbent material is regenerated by exposing it to changes in temperature. When the adsorbent material is regenerated by exposing it to changes in temperature and pressure, it can be preferred for the difference i pressure in each chamber between the adsorption and regeneration phases to be at least about 750 mbarg, more preferably at least about 1000 mbarg, especially at least about 1500 mbarg. The pressure in the chamber in which the adsorbent material is being regenerated can be less than atmospheric pressure or it can be more than atmospheric pressure. The difference between the pressure in the said chamber and atmospheric pressure can be at least about 100 mbarg, preferably at least about 150 mbarg, for example at least about 350 mbarg. When the difference between pressure within a chamber in the adsorption phase and atmospheric pressure is less than the difference between the pressures in the chamber in the adsorption and regeneration phases, the assembly can include a pump for changing the pressure in a chamber of the contaminant adsorption assembly below atmospheric pressure during regeneration of that material. Such a pump might reduce the pressure in the chamber to at least about 400 mbar below atmospheric pressure, preferably at least about 600 mbar. The pump can have other functions: for example, it can be used to draw atmospheric air into the system.

The contaminant adsorption assembly will comprise at least two chambers. Two chambers will be sufficient for many applications. However, it might be preferred for some applications to use an adsorption assembly which includes more than two chambers. This has the advantage that the air flow speed through the chambers can be reduced, giving rise to reduced resistance to air flow.

Preferably, the system includes a purge line through which air is supplied to a chamber of the contaminant adsorption assembly in which the adsorbent material is to be regenerated, the purge line supplying air from the outlet from the chamber through which air has flowed for adsorption of contaminants. The proportion of air from the chamber which flows in the purge line is preferably not more than about 25%, especially not more than about 5%, of the inlet flow.

Preferably, the assembly includes means for heating the adsorbent material in a chamber of the contaminant adsorption assembly during regeneration of that material. The heat can be supplied by one or more electric heaters located within the chamber. The temperature to which the adsorbent material is heated will be selected having regard to factors which include the nature of the adsorbent material, the strength of the interactions between the adsorbent material and adsorbed contaminants, the quantity of the contaminant material that has been adsorbed, and the energy required to heat the adsorbed material. A relatively high temperature can be preferred to optimise the purge of the adsorbed material.

The contaminant adsorption assembly can include components for conditioning air that is admitted from atmosphere. For example, the system can include means for heating or cooling the air which is admitted from atmosphere, especially which is distinct from means for conditioning air that is provided for treatment of uncontaminated air admitted from atmosphere or of recirculating air. Incorporating separate air cooling (or other conditioning) components can have the advantage that the process of adsorbing contaminants in the air can be made more efficient. The system can include means for collecting liquid droplets and solid particles carried in air that enters the system from atmosphere. This can take the form of a centrifugal separator in which vanes impart a spiralling flow to the air leading to liquid droplets carried by the air being made to coalesce; such separators are known. The system can include a filter for removing particulate contaminants from air entering the system. Suitable filter media include borosilicate glass microfibres.

Preferably, the auxiliary supply conduit in which the adsorption assembly is provided includes a fan to drive air through the adsorption assembly (positioned downstream of the adsorption assembly so that air is sucked through, or positioned upstream so that air is pushed through) and to provide an over-pressure to ensure that air is admitted to the system for mixture with air that is already within the enclosed space or being recirculated for supply to the enclosed space.

The contaminant adsorption assembly can be used to remove materials in vapour, liquid and particulate form from air that is to be breathed. The nature of the adsorbent material will be selected according to the nature of the contaminants in the air Examples of suitable adsorbent materials include activated carbons and molecular sieves.

Preferably, the system includes an assembly for adsorbing carbon dioxide from air within the enclosed space. The carbon dioxide adsorption assembly can comprise an extraction conduit through which air from the enclosed space is extracted for adsorption of carbon dioxide, and an injection line through which air from which carbon dioxide has been adsorbed in the assembly is reintroduced to be breathed within the enclosed space. The air which is treated in the carbon dioxide adsorption assembly can be admitted to it from the enclosed space or from the recirculation conduit or from the main supply conduit. The injection line for introduction of air from which carbon dioxide has been adsorbed can inject the air into the enclosed space or into the recirculation line or into the main supply conduit.

The assembly for adsorbing carbon dioxide can be the same assembly as adsorbs contaminants in air that is admitted from atmosphere. For example, when the contaminant adsorption assembly includes a compressor, air from the enclosed space (with a high carbon dioxide concentration) can be injected into the compressor inlet Preferably, the system includes a sensor for contaminants in atmospheric air. The nature of the sensor will depend on the nature of the contaminants which are to be detected. Preferably, the signals which cause (a) the inlet valve to move towards its fully closed position, and (b) each of the recirculation and auxiliary inlet valves to move towards its fully open position, are generated in response to detection by the sensor of contaminants in the atmospheric air. However, the signals can be generated in response to manual activation of the actuator. For example, they can be generated by movement of a switch.

The system can include additional components for treating air that is admitted to the system to be treated in the adsorption assembly. For example, the system can include one or more filters for air in the auxiliary supply conduit. Preferably, the auxiliary supply conduit includes a compressor for admission of air from the adsorption assembly into the enclosed space. The compressor can function to drive air through the enclosed space. The compressor can function to drive air from the enclosed space through the recirculation line, and through treatment components when present.

Embodiments of the present invention will now be described by way of example with reference to the accompanying drawings, in which.

Figure 1:
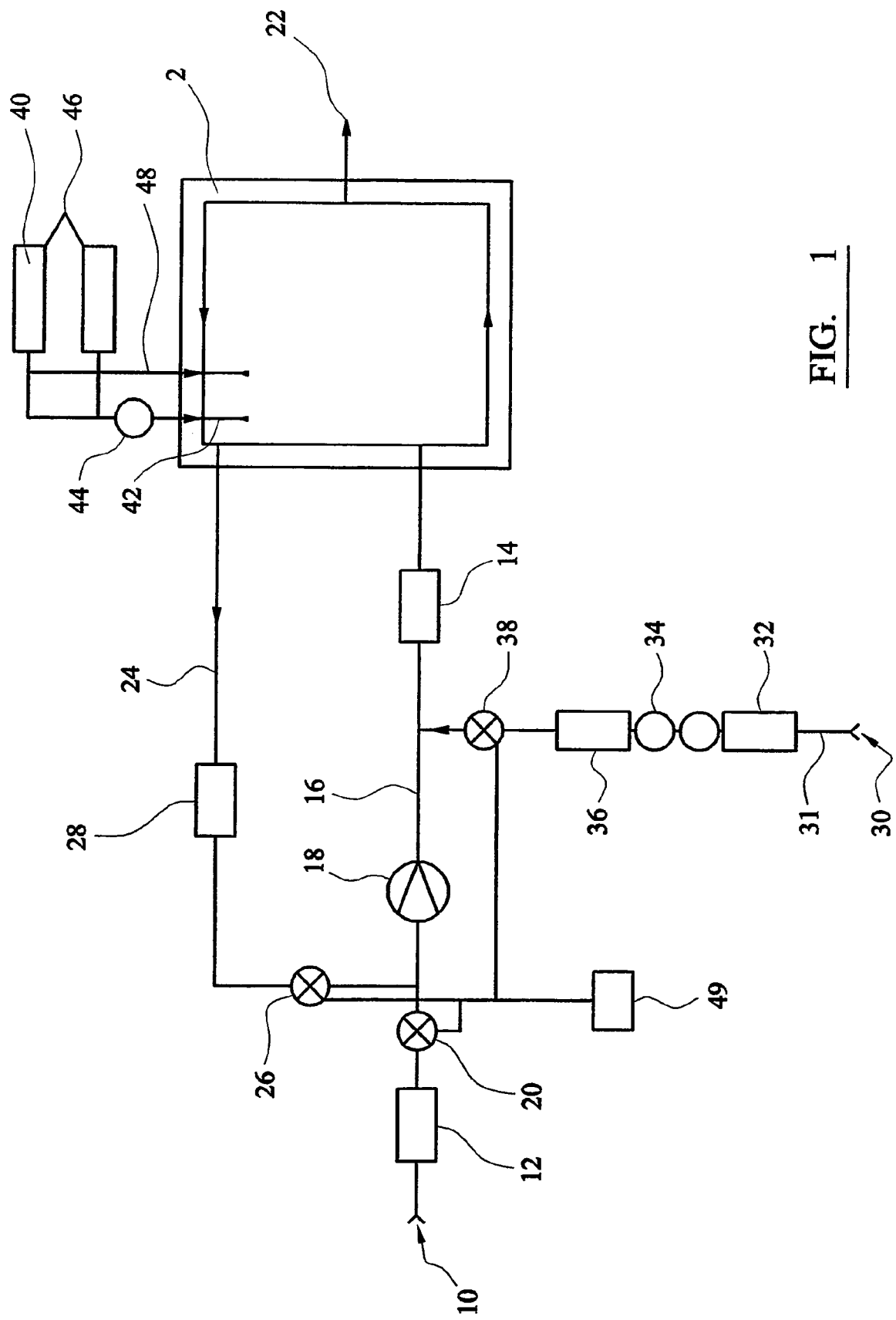
FIG. 1 is a schematic representation showing the components of an air treatment system according to the present invention.

Referring to the drawings, FIG. 1 shows a system for treating air which is to be breathed within an enclosed space 2. The space can be a vehicle such as an agricultural vehicle, or a service vehicle within a process plant in which there are unpleasant or dangerous fumes or vapours. The space can be a room within a building or an entire building.

Clean air is admitted to the system from atmosphere through an inlet 10. The air passes through a filter 12, especially a HEPA filter, and an air conditioning unit 14 into the enclosed space. The air is conducted through the filter and the air conditioning unit into the enclosed space through a main supply conduit 16, by means of a fan 18. The flow of air into the system through the inlet 10 is controlled by means of an inlet valve 20.

The air conditioning unit 14 serves to control the temperature and the humidity of the air that is admitted to the enclosed space. When the air that is admitted to the system through the inlet is cold, the air conditioning unit can increase the temperature of the air so that it does not detract from the comfort of individuals within the enclosed space. When the air that is admitted to the system through the inlet is warm, the air conditioning unit can reduce the temperature of the air.

The system includes an outlet 22 from the enclosed space through which air can flow out of the space, to maintain a mass balance within the enclosed space having regard to the influx of air through the main supply conduit. When the air from atmosphere that is admitted to the system is free from contaminants so that air is supplied through the inlet 10, the pressure within the enclosed space will be maintained at or close to atmospheric pressure The system includes a recirculation line 24 through which air from the enclosed space can flow into the supply conduit 16, upstream of the fan 18 and the air conditioning unit 14. The flow of air through the recirculation line can be controlled by means of a recirculation valve 26. Air flowing through the recirculation line 24 passes through a HEPA filter 28.

The system includes an auxiliary inlet 30 through which air can be admitted to the system from atmosphere. Air admitted to the system through the auxiliary inlet passes in an auxiliary supply conduit 31 through a compressor 32, and a filter 34 by which particulate material and droplets can be removed from the air. The system also includes a two chamber adsorption assembly 36 for removing contaminants from the air, which is described in more detail below with reference to FIG. 2. The flow of air into the system through the auxiliary inlet 30 is controlled by an auxiliary inlet valve 38. Air is discharged from the auxiliary supply conduit 31 into the main supply conduit 16, in which it flows through the air conditioning unit 14 into the enclosed space 2.

The system includes a carbon dioxide adsorption assembly 40 which includes an extraction conduit 42 in which air is extracted from the enclosed space 2, driven by a compressor 44. The air that is extracted from the enclosed space flows through a two chamber adsorption assembly 46 for removing carbon dioxide. The components, assembly and operation of the carbon dioxide adsorption assembly are broadly the same as for the adsorption assembly in the auxiliary supply conduit, with possible variations as suitable according to the required volume of the absorbent and the nature of the adsorbent having regard to the material that is to be adsorbed. The air which has been treated in the carbon dioxide adsorption assembly is returned to the enclosed space 2 through an injection conduit 48.

Instead of a separate carbon dioxide adsorption assembly, air from the enclosed space can be injected into the auxiliary supply conduit 31 (for example into the compressor 32), for carbon dioxide to be adsorbed in the adsorption assembly 36.

The system includes a sensor 49 for detecting contaminant materials in the atmospheric air, outside the system. The sensor will be configured so that it detects materials which are to be excluded from the enclosed space, for example because they are unpleasant to people breathing air in the enclosed space, or because they are dangerous. The invention finds application for these reasons in the vicinity of chemical process plants etc, where there might be a danger of leakage of dangerous materials.

In the event that the sensor detects a contaminant material, it generates signals which can control the inlet valve 20, the recirculation valve 26, the auxiliary inlet valve 38 and, when it is adjustable, a valve on the outlet 22 from the enclosed space.

When the atmospheric air is clean, the inlet valve 20 will be open allowing air to enter the system through the inlet. The recirculation valve 26 and the auxiliary inlet valve 38 will be closed, and the outlet 22 from the enclosed space will allow free flow of air out of the enclosed space. The fan 18 will ensure a flow of air from the inlet 10 through the air conditioning unit 14, and through the enclosed space.

When the sensor detects a contaminant material, it causes signals to be generated which (a) move the inlet valve 20 to its closed position, (b) move the recirculation valve 26 to its open position, (c) move the auxiliary inlet valve 38 to its open position, and (d) ensure that the outlet 22 from the enclosed space is such that a pressure differential is maintained between the enclosed space and atmosphere. In addition, in the presence of a contaminant material, the compressors 32, 44 associated with the contaminant adsorption assembly and the carbon dioxide adsorption assembly are switched on to cause gas to flow through those assemblies.

Accordingly, when a contaminant material is detected, air within the enclosed space is recirculated through the recirculation line 24 and its associated HEPA filter 28, and through the air conditioning unit 14. The air conditioning unit lowers the temperature and humidity of the air, as necessary, before it is reintroduced into the enclosed space.

A result of the recirculation of air after it has been breathed within the enclosed space, is that the concentration of oxygen in the air will decrease and the concentration of carbon dioxide will increase. The reduction in the concentration of oxygen is offset by the supply of air to the system through the auxiliary supply conduit 31. The increase in the concentration of carbon dioxide is offset by treatment of air from the enclosed space in the carbon dioxide adsorption assembly. The mass balance within the system is maintained as necessary by loss of air from the enclosed space (or elsewhere in the system) through the outlet 22.

The flow of air through the recirculation line 24 is driven by the fan 18 and the compressor 32 in the auxiliary supply conduit. However, the flow of air when air from the enclosed space is being recirculated can be driven by the compressor without the fan.

Figure 2:
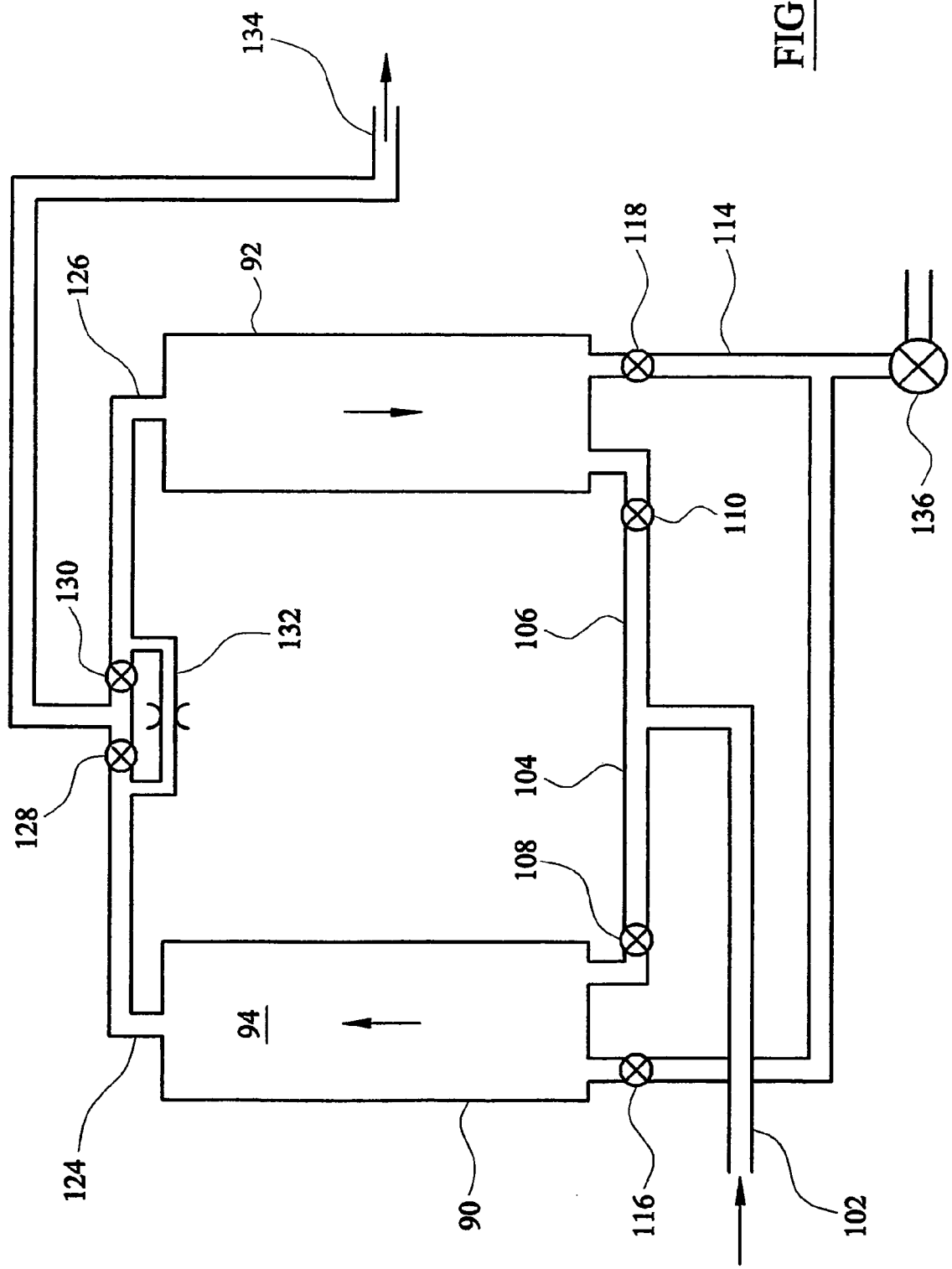
FIG. 2 is an enlarged view of the regenerative adsorption assembly which is incorporated in the system shown in FIG. 1.

FIG. 2 shows a two chamber absorption assembly of the general kind which can be used to remove contaminants from air supplied to the enclosed space (directly through the auxiliary supply conduit or indirectly as shown in FIG. 1), and to remove carbon dioxide from air after it has been breathed in the enclosed space. Variations in the design of the assemblies might include, for example, the nature of the contaminant materials, the volume of the chambers, the temperature and/or pressure conditions to which the chambers are exposed while the adsorption material is being purged of adsorbed gas and so on. Selection of design parameters of these types is well established.

The assembly shown in FIG. 2 comprises two chambers 90, 92. Each chamber contains a material 94 which adsorbs gaseous contaminants in the air. Air is fed to the assembly through an assembly inlet 102. The inlet divides into left and right branches 104, 106 for supply of air to the chambers 90, 92. Each inlet branch has a valve 108, 110 in it for controlling the supply of air to the chambers.

Purge branches 112, 114 communicate with each of the chambers 90, 92 at the same ends thereof as the inlet branches 104, 106. The flow of air through each of the purge branches is controlled by means of purge branch valves 116, 118.

Air that is to be treated flows through the chambers over the adsorbent material. Air leaves the chambers through outlets 124, 126. The flow of air through the outlets is controlled by means of outlet control valves 128, 130. A purge stream line 132 extends between outlets 124, 126 to permit a small amount of gas to flow between the chambers when there is a pressure differential between them.

For a first one 90 of the chambers, the inlet branch valve 108 is open and the purge branch valve 116 is closed. For the other 92 of the chambers, the inlet branch valve 110 is closed and the purge branch valve 118 is open. As a result, air entering the assembly through the inlet 102 passes through the first chamber 90 where it flows over the adsorbent material 94 therein so that contaminants in the air are adsorbed. The outlet control valve 128 for that chamber is open so that air leaving the first chamber 90 can flow to the supply line 134. The outlet control valve 130 for the other chamber is closed so that there is substantially no flow of air into or out of the second chamber 94. There is however a small purge stream of air through the purge stream line 132 from the first chamber into the second chamber. This small stream of air is able to flow through the second chamber in a direction that is opposite to the direction in which air flows when it is being treated. By virtue of the settings of the inlet branch valve 110 and the purge branch valve 118, the purge stream passes into the purge branch 114. Its flow can be facilitated by means of a vacuum pump 136. During the purge phase of the second chamber, power is supplied to electric heaters (not shown) within the chamber, by which the temperature of the adsorbent material is heated to facilitate purging of adsorbed material thereon.

After a predetermined period of exposure to contaminated air, or when the level of detected adsorbed contaminants in the first chamber exceeds a predetermined level, the positions of the valves in the inlet and purge branches, and of the outlet control valves, are switched so that the first chamber is purged of adsorbed contaminants while the second chamber is exposed to the air which needs to be treated.

The invention claimed is:

1. A system for treating air which is to be breathed within an enclosed space, which comprises:
   a. a primary inlet through which air can be admitted to the system from atmosphere,
   b. a primary inlet valve by which the flow of air into the system through the primary inlet can be regulated,
   c. an outlet through which air within the enclosed space can be vented to atmosphere,
   d. a recirculation line through which air from the enclosed space can be recirculated, to be readmitted to the enclosed space,
   e. a contaminant adsorption assembly by which contaminants in atmospheric air can be adsorbed, the assembly being provided in an auxiliary supply conduit through which air from atmosphere can flow for (i) treatment by the adsorption assembly to adsorb contaminants, and (ii) mixture with air that is in or is for supply to the enclosed space,
   f. an auxiliary inlet valve by which the flow of air through the contaminant adsorption assembly and the auxiliary supply conduit can be regulated,
   g. a sensor for detecting atmospheric contaminants,
   h. an actuator which can generate signals to control the inlet and auxiliary inlet valves,
   i. components for controlling the temperature and the humidity of the air that is supplied to the enclosed space, the temperature and humidity control components being located so that air passing into the enclosed space from each of the primary inlet and the recirculation line and the auxiliary supply conduit passes through the said components before being admitted to the space,
in which, when the sensor detects atmospheric contaminants, the actuator is programmed to generate signals which cause (a) the primary inlet valve to move to its fully closed position, and (b) the auxiliary inlet valve to move towards its fully open position.

2. A system as claimed in claim 1, in which air from the enclosed space that is recirculated through the recirculation line is readmitted to the enclosed space without having passed through the contaminant adsorption assembly.

3. A system as claimed in claim 1, which includes a recirculation valve by which the flow of air through the recirculation line can be controlled.

4. A system as claimed in claim 3, in which the actuator can generate signals to control the recirculation valve, the recirculation valve being caused to move towards its fully open position together with the movement of the auxiliary inlet valve towards its fully open position and movement of the primary inlet valve towards its fully closed position.

5. A system as claimed in claim 1, which includes a main supply conduit through which air is supplied to the enclosed space, and in which the recirculation line introduces air from the enclosed space into the supply conduit for reintroduction to the enclosed space.

6. A system as claimed in claim 5, in which the components for conditioning the air that is to be supplied to the enclosed space are provided in the main supply conduit.

7. A system as claimed in claim 5, in which the auxiliary supply conduit is connected to the main supply conduit so that air that has passed through the contaminant adsorption assembly is introduced into the enclosed space through the main supply conduit.

8. A system as claimed in claim 1, in which the contaminant adsorption assembly comprises at least two chambers which contain an adsorbent material, arranged so that air flowing into the assembly for supply to the enclosed space can pass through one of the chambers for adsorption of contaminants before supply to the enclosed space while adsorbent material in another of the chambers is purged of adsorbed contaminants.

9. A system as claimed in claim 1, which includes an assembly for adsorbing carbon dioxide from air within the enclosed space.

10. A system as claimed in claim 9, in which the carbon dioxide adsorption assembly comprises an extraction conduit through which air from the enclosed space is extracted for adsorption of carbon dioxide, and an injection line through which air from which carbon dioxide has been adsorbed in the assembly is reintroduced to be breathed within the enclosed space.

11. A system as claimed in claim 10, in which the injection line introduces air from which carbon dioxide has been adsorbed into the enclosed space.

12. A system as claimed in claim 1, which includes a sensor for contaminants in atmospheric air.

13. A system as claimed in claim 12, in which the signals which cause (a) the primary inlet valve to move towards its fully closed position, and (b) the auxiliary inlet valve to move towards its fully open position, are generated in response to detection by the sensor of contaminants in the atmospheric air.

14. A system as claimed in claim 1, which includes a fan for circulating air through the enclosed space.

15. A system as claimed in claim 14, which includes a main supply conduit through which air is supplied to the enclosed space, and in which the fan is located so that it acts on air flowing in the main supply conduit.

16. A system as claimed in claim 1, in which the auxiliary supply conduit includes a compressor for admission of air from the adsorption assembly into the enclosed space.

17. A system as claimed in claim 1, which includes a filter in the inlet for removing contaminants from air that is admitted to the system from atmosphere.

* * * * *